INVENTORS:
NICKOLAS SCHMITT,
DAVID M. WILLYOUNG,
BY W. C. Crutcher
THEIR ATTORNEY.

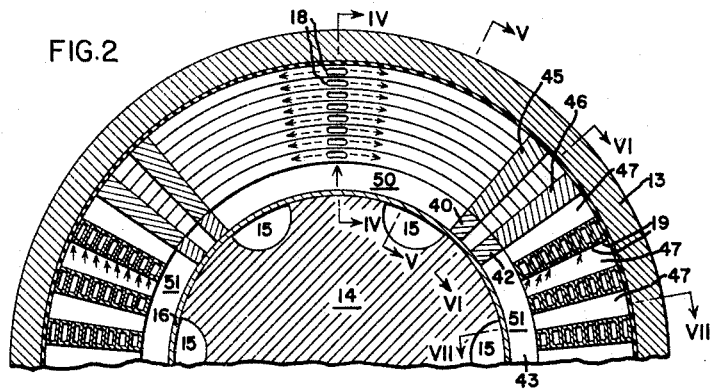

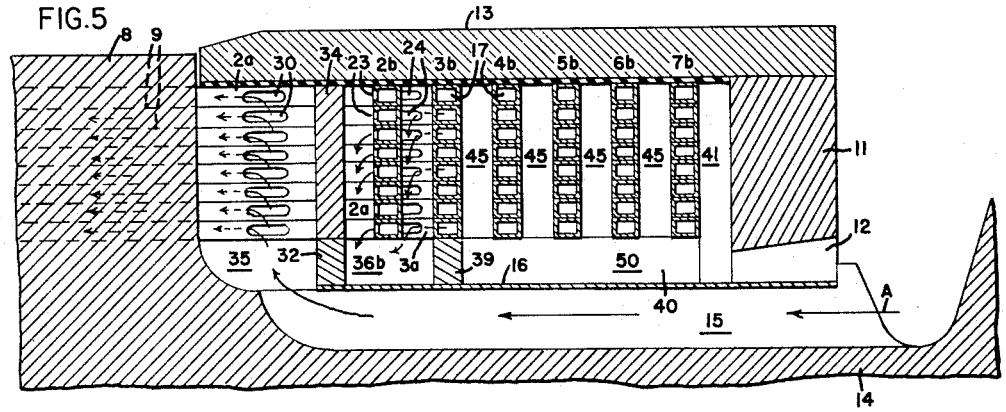
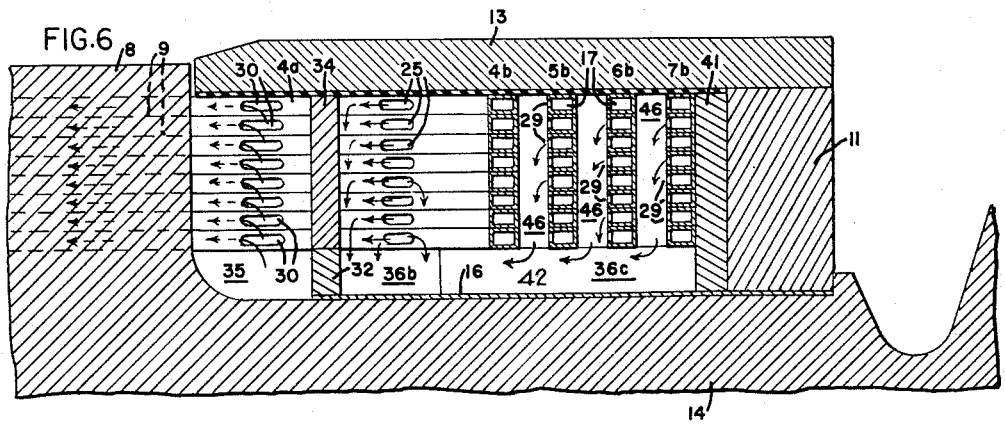
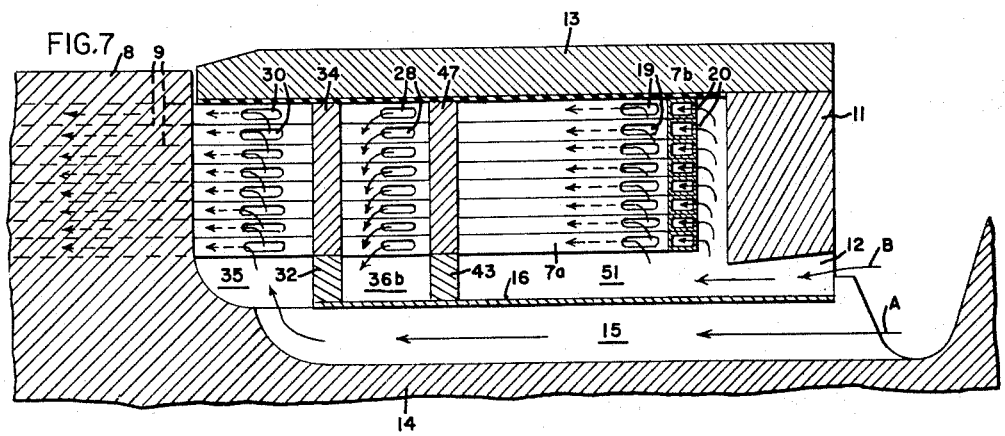
INVENTORS:
NICKOLAS SCHMITT,
DAVID M. WILLYOUNG,
BY W. C. Crutcher
THEIR ATTORNEY.

3,005,119
VENTILATION OF THE END WINDINGS OF LARGE DYNAMOELECTRIC MACHINE ROTORS

Nickolas Schmitt and David M. Willyoung, Scotia, N.Y., assignors to General Electric Company, a corporation of New York
Filed Aug. 5, 1960, Ser. No. 47,802
4 Claims. (Cl. 310—61)

This invention relates to dynamoelectric machine rotor cooling, and more particularly to an improved separated end turn and slot winding cooling arrangement for rotors having "direct-cooled" windings.

It is well known that one of the main factors limiting the output of a large dynamoelectric machine, such as a turbine-generator, is the rise in temperature of the windings. In large generators, the windings have recently been cooled by placing the coolant gas in direct contact with the conductor to more effectively dissipate the heat from the windings. This method is called "direct cooling." In a rotor cooled in this manner, all or part of the windings are cooled by admitting cooling gas to passages within the main conductor insulation by means of ports located in the end turn portions, under the retaining rings. From these ports, the gas is carried through the conductor end windings and coil slot portions to an intermediate portion of the rotor, and then exhausted to the air gap. To provide direct cooling of the end turn portions of the winding, the inlet ports have been located at or close to the center of the peripheral section of the coil end. This arrangement, while generally satisfactory, tends to limit the rating of the rotor below what it could be if the end turns were cooled separately from the coil slot portions. This is because the permissible rating of a direct-cooled section of a rotor winding is dependent on the length of the section and the mass of cooling gas flowing through it. With increased length, the gas flowing through the ducts must carry away more heat, but the increased fluid friction between gas and conductor tends to reduce the flow. This requires that the $I^2R$ losses per unit length of the coil must be reduced, as the length increases, in order to maintain a given maximum temperature in the conductor. The longer outer coil ends may be considerably handicapped by this effect, while for the shorter inner coil ends it may be of less consequence.

Later arrangements cooled the end turns separately by free convection over grids attached to the end windings as disclosed in U.S. Patent 2,904,708, issued to D. M. Willyoung on September 15, 1959. This allowed the gas cooling the outer coil ends and inner coil ends to mix, thus averaging the temperature. Thus the capability of the rotor was set by the capability of the average coil rather than being limited by the longer outer coil.

This invention is, in many respects, an improvement over an arrangement disclosed in U.S. Patent No. 2,833,-944, issued to D. M. Willyoung on May 6, 1958, and assigned to the assignee of the present application. In that patent, the end turns were cooled by forced convection, separately from the portions of the winding lying in the rotor slots. The latter portions of the winding (slot-lying portions) were cooled by introducing cooling gas from the annular space between the rotor spindle and the underside of the end turns into the sides of the slot-lying portions near the end of the rotor body. Since the cross-sections of the slot-lying portions are dictated by the geometry of the rotor, the restricted flow conduits for passing coolant gas along the slot-lying portions are limited to a maximum size and, at a given pressure differential across these slot-lying ducts, will only pass a given mass flow of cooling gas. Since the outlet temperature of the gas is restricted to a certain maximum safe temperature, and since the inlet temperature of the gas is limited by the capacity of the recirculating cooling system, any heat picked up by the slot cooling portion of the gas by free convection from the end turns of the windings as it passes beneath the end turns causes the temperature of the slot cooling portion of the gas to be higher at the point where it enters the slot-lying portions of the winding. On the longer coils especially, the heat picked up by free convection is at least 30% and may be as much as 50% of the end winding heat. This reduces the effectiveness of the slot cooling portion of the gas.

The efficient use of the space between the end turns and the spindle of the rotor in dynamoelectric machines of larger size becomes of paramount importance for the following reasons. First, the diameter of the spindle portion is limited to a minimum value so that the rotor will be stiff enough to resist bowing due to its length, which may be up to 28 feet, and great weight, which may be over 120,000 pounds. Secondly, the end turns lying outward of the spindle are necessarily of a certain minimum size in order to carry the field current without excessive rotor current density and heating in the windings and in order to provide internal cooling conduits of sufficient size for forced convection cooling of the end turns. Thirdly, the outer diameter of the end turn annulus is limited by the maximum diameter of the retaining ring which holds the end turns in position against centrifugal force. This retaining ring is generally the most highly stressed part of the rotor, thus requiring that it be held to as small a diameter as possible to reduce the stresses; axial ducts or notches in the retaining ring are generally not permissible, since these would cause stress concentrations. The "centering ring," on the other hand, which is the disklike member disposed between the end of the retaining ring and the spindle, holding the retaining ring concentric with the spindle, may generally be notched at its inner diameter without causing dangerous stresses.

For the above reasons, the flow area available for passing cooling gas between the retaining ring and the rotor spindle is quite restricted and may be described generally as an annular area between the spindle diameter and the radially innermost parts of the end turns. The size of this annular area limits the amount of cooling gas which can be supplied to the direct-cooled rotor windings and its most efficient use through baffling arrangements which control the entering gas is of great importance.

Prior art cooling arrangements for separately cooling the end turns and slot-lying portions of the windings have introduced both portions of the coolant in a single flow through this annulus. As machines have become larger, the problem of obtaining more cooling capability of the windings without being able to appreciably increase the size of the annulus available for introducing coolant has greatly hampered designers of these machines and has caused the end turn zone to be one critical aspect of the design.

Another desirability is to obtain the highest cooling capability from the rotor without raising hydrogen pressure and by utilizing only the rotor self-pumping head to circulate the coolant.

Accordingly, one object of the present invention is to provide a structure for increasing the cooling capability of the coolant supplying the slot-lying portions of the winding.

Another object of the invention is to provide an improved baffling arrangement for distributing the portion of the coolant which cools the end turns of the winding.

Another object is to provide an improved arrangement for cooling the end turns of the outermost coils.

Still another object is to make the most efficient use of the coolant flow space available beneath the retaining ring of a dynamoelectric machine rotor.

Another object is to obtain higher capability from the rotor end windings and end ventilated parts using only the rotor self-pumping head.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2 is an end view of one-half of the rotor taken along lines II—II of FIG. 1;

FIG. 3 is likewise an end view of the other half of the rotor taken along lines III—III of FIG. 1;

FIGS. 4-7 are sectional views taken in radial planes showing the end turn portions of the winding, at various circumferentially spaced locations about the rotor as indicated by the arrows IV—IV through VII—VII, respectively, shown on both FIGS. 1 and 2.

Figure 1:
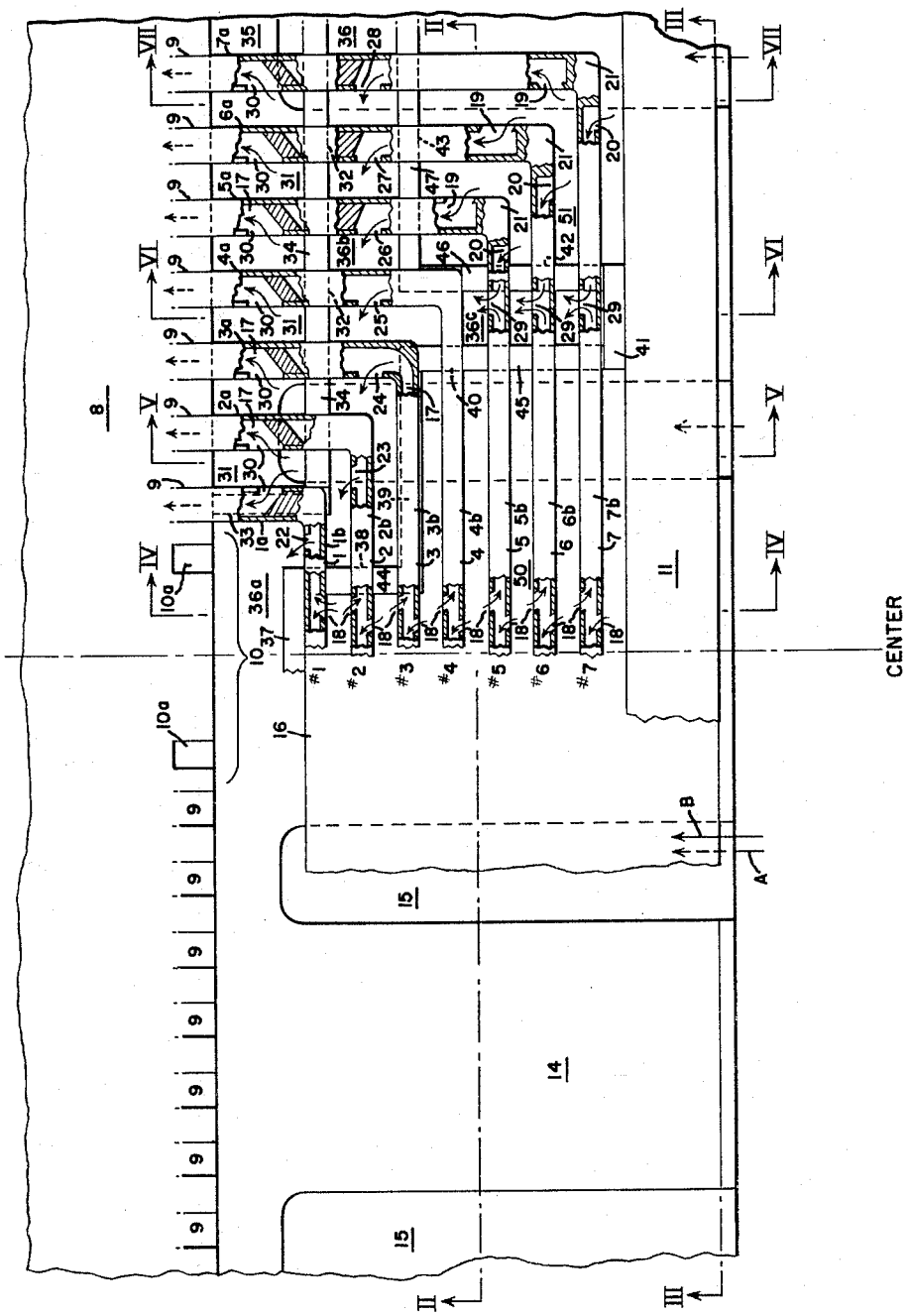
FIG. 1 is a developed plan view of the end turn portions of a rotor winding, partly in section, looking radially inward with the retaining ring removed.

Generally stated, the invention is practiced by separating the cooling gas into two main flows at the point where it enters between the retaining ring and the rotor spindle. The first portion is conducted directly by means of subslots and in non-commingling relationship with the second portion to discharge in a circumferential intake zone adjacent the rotor body for feeding the slot-lying portions with relatively cold coolant. The second portion is separately introduced into the end turns at the center thereof and is discharged to a circumferential discharge zone leading to a discharge duct in the pole portion of the rotor. For the highest capability applications a special baffling arrangement forms a longitudinally extending duct connecting with the circumferential discharge zone. This serves a dual function of acting as a coolant discharge duct for the outermost coils and for further subdividing the second portion of coolant. The subdivided portion separately cools the outermost coils both from their centers and from their corners, thus subdividing the flow paths of the coolant in the longer outermost coils into short lengths.

Referring now to FIG. 1 of the drawing, a developed plan view of slightly more than one-half of the rotor end winding section is illustrated. The end turns comprise the end loops of radially stacked concentric coils 1-7 numbered from "innermost" (nearest the rotor body) coil to "outermost" (farthest from rotor body) coil. Each coil 1-7 has axially extending conductors 1a-7a and connecting circumferentially extending conductors 1b-7b. It will be seen that both the circumferentially extending portions and the longitudinally extending portions become progressively longer, moving from the innermost coil to the outermost coil, hence progressively more difficult to cool. For the purpose of this discussion, coils 5, 6 and 7 having the longest end turn conductors will be designated collectively as the "outermost coils."

The axially extending conductors 1a-7a enter the rotor body 8 and are shown there as slot-lying portions 9 on either side of the rotor pole, which is indicated by bracket 10. The pole 10 also defines coolant discharge notches 10a which extend beyond the end of the retaining ring (not shown). Axially outward from the end windings and spaced from the rotor body 8 is the centering ring 11 beneath which the cooling gas enters the rotor.

Reference to FIG. 3 of the drawing shows one half of the rotor in a section taken through the rotor spindle which illustrates the manner in which the coolant enters the rotor. There the centering ring is shown to be notched at its inner diameter to define gas intake passages 12. Radially outward of the centering ring 11 may be seen the retaining ring 13 which serves to hold the end windings against displacement due to centrifugal force. Extending through a hole in the centering ring 11 is the rotor spindle 14 which is grooved at circumferentially spaced locations to define a second group of gas intake passages 15.

The extent to which spindle 14 may be grooved to provide the intake passages 15 is dictated primarily by considerations of spindle stiffness. The spindle diameter generally is made as large as possible to prevent excessive bowing and to provide as stiff a shaft as possible to give higher critical speeds. The retaining ring, on the other hand, is made as small in diameter as possible to prevent excessive stresses. Therefore, the total space for entering coolant beneath the end turns is generally made as small as possible consistent with the gas flow that has to pass through this area. Although equivalent spindle stiffness in different diameter spindles may be obtained by juggling the diameter of the spindle and the size of passages 15, the maximum total cross-sectional area of passages 12, 15 collectively is set by numerous interacting design considerations primarily dictated by spindle stiffness and retaining ring diameter.

Separating the gas intake passages 12, 15 is a flow dividing means 16 which in the preferred embodiment takes the form of a continuous circumferential member, preferably though not necessarily of insulating material. This flow dividing means 16 is one of the basic features of the invention and can take several forms. Since here, the divider 16 is located at the interface between spindle 14 and centering ring 11, it can be one continuous member. However, it could also be formed from short sections disposed in passages 15. The criterion is that it be so placed as to divide the entering flow into two separated portions and to isolate the portion cooling the slot-lying parts of the coil from any contact with the portion cooling the end windings. In the embodiment shown, one portion enters through passages 12 and the other portion through passages 15.

Referring again to FIG. 1 of the drawings, it will be seen that the cooling gas enters through passages 15 below the flow dividing means 16 as shown by the dotted arrow A and through passages 12 on top of divider 16 as shown by the solid arrow B. The gas entering axially through passages 12, 15 enters the windings to flow through internal passages 17 defined by the conductors themselves. Passages 17 may be formed in several ways known to those skilled in the art, as by laying together rolled or extruded sections or by hollow extrusions or in other ways. For the purpose of simplicity in this description, the conductors of coils 1-7 are shown merely as hollow conductors of rectangular cross-section, the purpose being, of course, to conduct the coolant in heat exchange relationship with the conductors. Passages 17 are of relatively small cross-section limiting the flow of coolant therethrough and it will be understood that conducting the gas through several such passages of short length in parallel rather than through a single long section will increase the mass of cooling gas flowing and hence will enable a cooler winding to be achieved with higher capability for conducting current without overheating.

Access to internal passages 17 of the end windings is provided at the center of each coil by means of ports 18 which are arranged in the sides of the circumferentially extending conductors 1b-7b so as to allow the gas to flow into the circumferentially extending portions in both directions as indicated by the arrows. The coolant may enter the longer outermost coils also by means of ports 19, 20 disposed on either side of the corners 21 of outermost coils 5-7. Inlet ports 18, 19, 20 are shown for clarity as being cut in the sides of the conductors, but they might preferably be punched radially to intersect conduits 17 so as to feed the passage in each of the radially stacked layers from the bottom, at the same time avoiding hazardous lateral notches near the coil corners where the flexural motions due to thermal expansion are the greatest. Coolant entering ports 19 flows toward the body 8 through the axially extending conductors 5a–7a and coolant entering through ports 20 flows circumferentially through circumferentially extending portions 5b–7b. Ports 18, 19 and 20 respectively located at the centers of all coils and at the corners of the outermost coils comprise gas intake conduits for cooling the end turns of the winding.

The discharge conduit means for the coolant cooling the end turn portions of the windings consist of outlet ports 22, 23 in the circumferentially extending parts of coils 1 and 2 respectively; outlet ports 24, 25 in the axially extending portions of coils 3 and 4; and ports 26, 27 and 28 in axially extending portions of coils 5–7 respectively. In the outermost coils additional outlet passages 29 are provided in an intermediate portion of the circumferentially extending portions of coils 5–7. Placement of outlet ports 29 in the longer circumferential portions of the outermost coils shortens the length of conductor that must be cooled by these individual flow circuits.

The aforedescribed system of intake and discharge ports in the end turns is supplied by means of the gas flow B entering through the intake passages 12 in the centering ring. The proper distribution of the gas is accomplished by means of baffling or blocking disposed beneath and between the end turn conductors, later to be described in more detail.

The slot-lying portions 9 of axially extending conductors 1a–7a are cooled by an entirely separate supply of coolant A entering through passages 15 below divider 16 and isolated from the first supply of coolant B. Coolant entering through passage 15 is conducted inward to a zone near the rotor body 8 and enters through ports 30 cut in the sides of conductors 1a–7a after passing radially outward and upward through spaces 31 between these conductors. The coolant entering through ports 30 flows axially along the conductors inside the winding slots and later discharges at axially spaced ports (not shown) into the air gap where it is collected and recirculated. The manner of collecting the slot cooling portion A of the gas entering through ports 30 is not shown since it is not material to the present invention, but a suitable method is disclosed in U.S. Patent No. 2,702,870, issued to R. H. Norris on February 22, 1955, and assigned to the assignee of the present invention. This gas supplied through ducts 15 enters ports 30 at a low temperature since it is isolated from the commingling with the coolant supplying the end windings and does not pick up any heat by free convection from the end windings due to the divider 16. Hence it arrives at ports 30 with appreciably greater cooling capability than with prior art arrangements.

Although the portion A of cooling gas supplied through passages 15 is shown in the drawings as entering the slot-lying portions 9 through ports 30 cut in the conductors 1a–7a near the end of the rotor body, portion A could also obviously enter sub-slots (not shown) below the slot-lying portions 9 and cool these portions of the windings by passing outward from the sub-slot radially or diagonally through the windings, depending on how the ventilation of these parts of the winding is arranged. For example, a suitable arrangement for utilizing portion A of the cooling gas for cooling the slot-lying portions of the winding is disclosed in U.S. Patent 2,986,664, issued to David M. Willyoung and Peter A. Becker on May 30, 1961. In that patent, the cooling gas for cooling the ends of the slot-lying portions 9 enters through a sub-slot and ventilates these portions by diagonal flow through punched conductors.

For obtaining the highest capability from the ends of these slot-lying portions 9, and relying only on the rotor self-pumping pressure to induce flow, it may be advantageous to sub-divide the portion A of the cooling gas into two parts and to cool the outermost length of the slot-lying portions 9 with gas entering through ports such as 30 and traveling axially inward through internal passages in the conductors to intermediate discharge ports, and carrying the other part of portion A below the coil in a sub-slot to enter the coil further along inside the rotor.

The special baffling arrangement which leads to most efficient use of the restricted flow area under the retaining ring may be described as follows. The coolant portion A (FIGS. 5 and 7) entering through passages 15 and supplying cold gas to ports 30 is further separated from the coolant portion B cooling the end turns by means of a circumferentially extending arcuate segment 32 of insulation material disposed on the rotor beneath the axially extending conductors 1a–7a. Segment 32 could also be composed of individual blocks. Blocking 32 joins an additional blocking member 33 (FIG. 1) which extends longitudinally and abuts the rotor body beneath the innermost coil 1. Additional radial blocking members 34 extend upward between coils 1–7 between blocking segment 32 and the inside diameter of the insulated retaining ring. Thus a circumferential conduit or cold gas intake zone for flow A is defined extending around the rotor with the exception of the rotor body pole portions 10 and defined by blocking members 32–34, the spindle outside diameter, the end of the slotted portion of rotor body 8, and the inner diameter of retaining ring 13. This circumferentially extending intake zone is designated by numeral 35 and may be seen more clearly by reference to FIGS. 5–7. FIGS. 1, 5 and 7 also show how supply passages 15 extend beyond the end of divider 16 and blocking members 32 so that slot 15 will communicate with circumferential intake zone 35.

Additional blocking members define together with the first mentioned blocking members 32–34 a coolant discharge zone 36. These additional blocking members comprise members below the end turns starting at the pole 10, as follows: Circumferentially extending blocks 37 connecting axially extending blocks 38 connecting circumferentially extending blocks 39 connecting axially extending blocks 40 connecting circumferentially extending blocks 41 connecting axially extending blocks 42 connecting circumferentially extending blocks 43. Additional radial blocking members extending between the aforementioned members and the retaining ring may be seen at 44–47. Blocks 37–47 completely seal off a discharge zone between the spindle and the retaining ring. The discharge zone 36 is comprised of a pole discharge zone 36a, a circumferentially extending discharge zone 36b axially outward from intake zone 35, and an axially extending discharge zone 36c.

The pole discharge zone 36a receives spent coolant from both the circumferential and axial parts of the end windings and from this relatively large unrestricted flow area it flows from the rotor body beneath the retaining ring by means of notches 10a in the pole portion. Circumferentially extending discharge zone 36b receives spent coolant from ports 22, 23, 24, 25 of innermost coils 1–4. It also receives spent coolant from the shortened flow path sections in the axial parts of outermost coils 5–7 by means of ports 26, 27, 28. The longitudinally extending discharge zone 36c encloses short sections between the corners and the coil centers of the outermost coils and receives spent coolant from the shortened flow paths in these outermost coils from ports 29.

The remainder of the space underneath the retaining rings comprises intake zones fed by flow B through passages 12.

The coil center intake zone is designated at 50 and is defined by blocking members 37–41, 44 and 45 together with the end turns, centering ring 11 and retaining ring 13. The coil center intake zone is seen most clearly in FIGS. 2 and 4. For a two-pole rotor, two such intake zones 50 supplying the coil centers serve to cool the innermost coils 1–4 of the end winding which are of a relatively short length and also serve to cool a portion of the outermost coils 5–7 along shortened flow paths between ports 18 and discharge ports 29.

The preferred embodiment shown employs an additional intake zone fed by the remainder of flow B, which is specifically utilized for feeding the corners of the outermost coils 5–7 through ports 19 and 20. This coil corner intake zone is designated 51 and is seen most clearly in FIGS. 2 and 7. The portion of flow B entering corner intake zone 51 is exclusively for cooling portions of the longer outermost coils and provides coolant which flows axially toward the body in the axially extending portion and circumferentially toward the coil center in the circumferentially extending portions of coils 5–7.

In an alternate embodiment of the invention, for applications where less capability is required from the end winding sections, flow B may enter the outermost coils only at the coil center ports 18 and discharge through ports 26, 27, 28 on the axially extending portions of the coil similar to the ventilation arrangement shown in FIG. 1 for coils 3 and 4. In the latter case, of course, outlet ports 29 and inlet ports 19, 20 would be omitted. Flow passages around the coil corners similar to those shown for coils 3 and 4 would be provided for all coils. Blocking members 40, 41, 42 and 45 would be omitted, and circumferential blockings 39 and 47 would be combined into a continuous circumferential blocking member. This would eliminate the axially extending discharge zone 36c and require that all the electrical loss generated in the outermost coils between the center of the coil and discharge ports 26, 27, 28 be carried away by cooling gas circulating through these passages.

The operation of the improved ventilating arrangement for the end windings may be described as follows.

The entering cooling gas is subdivided into two main portions at the point where it enters the rotor. The first portion passes beneath the end windings and is isolated therefrom by means of divider 16. This cold gas passes directly to the circumferentially extending intake zone 35 adjacent the rotor body thence to pass axially in the slot-lying portions of the winding. Grooves 15 serve to furnish cold gas only for the slot-lying portions of the winding and need be no larger than for this purpose. The second portion of the cooling gas enters through passages 12, cools the end windings, and exhausts through rotor pole recesses 10a. This portion of the gas for cooling the end windings is further subdivided by means of baffles and/or placement of the ports 12 in the centering ring so as to allow cooling of the outermost coils of the end winding in short sections with low flow resistance thereacross. One subdivided portion enters at the centers of all coils and cools the shorter innermost coils of the end windings in their entirety. This portion also cools a short section of the circumferentially extending parts of the longer outermost coils. The other subdivided portion of the end-winding coolant is exclusively for cooling the outermost coils in short sections and enters these outermost coils at the corners to flow both axially and circumferentially inside the windings.

The circumferentially flowing portions of the gas entering through both intake zone 50 and intake zone 51 discharge together in an axially extending discharge zone 36c and from there flow to the rotor pole discharge zone 36a. The axially flowing portion of the coolant entering from zone 51 and also the total quantity of spent coolant entering the innermost coils from zone 50 exhausts to a circumferentially extending discharge zone 36b and from there is also conducted to the pole discharge zone 36a. Thus the spent coolant which has been used to cool the end winding is discharged from the restricted flow passages in the end windings prior to the entry of the cold gas from zone 35 into the slot-lying portions of the turns.

The foregoing arrangement of baffles to subdivide the area available for coolant entry provides a very efficient use of the space under the retaining ring. The longer passages of the outermost coils are broken down into many parallel flow paths thus permitting more coolant to flow through the windings. The ducting of cold gas from the centering ring directly to the entry point of the slot-lying windings also provides a high capability for cooling this portion of the windings.

It will be appreciated by those skilled in the art that still further subdividing of the circumferentially extending portions of the outermost coils can be provided by placing additional longitudinal blocking members so as to provide additional longitudinally extending discharge conduits such as 36c so as to provide as short a flow path as required.

It will further be appreciated that where less capability is required in the end winding portions of the rotor, the axially extending portion 36c of the discharge zone 36 can be omitted with the outermost coils cooled in a manner similar to coils 3 and 4, FIG. 1.

In applications where still less capability is required by the end winding portions, the outer baffle system 39, 40, 41, 42, 43 can be omitted completely and the coil end windings from the coil center around the baffle 34 can be cooled entirely by free convection, using extended grids as in U.S. Patent 2,904,708, for example. For such a reduced end winding capability rotor, hollow passages and ports to and from these passages in the end winding sections could likewise be eliminated since no differential pressure would exist across such end winding cooling circuits. The end winding cooling gas would exhaust through ducts 10a in the rotor pole. The end-ventilated parts of the winding fed by flow A through passages 15 would retain their very effective cooling, however, and thus a longer length of the winding could be cooled from the rotor ends than would be the case if flow A were not isolated from the other cooling gas circulating around the end windings.

Thus while only a higher capability embodiment of the invention has been shown, for lower capability applications the axially extending section of the discharge chamber might be omitted and for still lower capability applications all the features required to establish forced convection through the hollow end winding conductors might be omitted, while still retaining the feature of the invention for feeding cold gas directly to the slot-lying portions.

While there has been described what is at present considered to be the preferred embodiment of the invention, it will be understood that various other modifications may be made therein, and it is intended to cover in the appended claims all such modifications as fall within the scope of the invention.

What we claim as new and desire to secure by Letters Patent of the United States is:

1. A dynamoelectric machine rotor having a central body portion defining axial winding slots circumferentially spaced on its periphery on either side of a pole portion and spindles at either end of the body, a rotor winding comprising axially extending slot-lying portions disposed in said winding slots and end turns extending beyond the rotor body including end turn axial portions formed by extensions of the slot-lying portions and end turn circumferential portions connecting said axial portions, said winding defining in at least its slot-lying portions longitudinal coolant passages in heat exchange relationship therewith, a retaining ring holding the end turns in place against centrifugal force, first blocking means disposed beneath and between the end turn axial portions and defining together with the rotor a first circumferentially extending inlet zone adjacent the rotor body slotted portion, said axial portions disposed in the inlet zone also defining winding gas inlet means communicating with the longitudinal passages of the slot-lying conductors, first inlet conduit means extending axially beneath the end turns for conducting a first portion of coolant gas to said first inlet zone, whereby cold gas may be furnished directly to the slot-lying portions, said first blocking means also defining on the opposite side thereof together with the rotor and the retaining ring an end turn cooling zone extending generally circumferentially adjacent the rotor body along the rotor pole portion and adjacent but axially outward of the first baffle means along the rotor slotted portion, said pole portion defining ports for removing the gas from beneath the retaining ring, second inlet conduit means introducing a second portion of coolant gas to the end winding cooling zone for cooling the end windings, and flow dividing means separating the first and second inlet conduit means preventing communication between the end winding cooling gas and the slot winding cooling gas.

2. A dynamoelectric machine rotor having a central body portion defining axial winding slots circumferentially spaced on its periphery on either side of a pole portion and spindles at either end of the body, a rotor winding comprising axially extending slot-lying portions disposed in said winding slots and end turns extending beyond the rotor body and radially spaced from the rotor spindle including end turn axial portions formed by extensions of the slot-lying portions and end turn circumferential portions connecting said axial portions, said winding defining internal coolant passages for conducting a cooling gas, a retaining ring holding the end turns in place against centrifugal force, first blocking means disposed beneath and between the end turn axial portions and defining together with the rotor and retaining ring a first circumferential extending inlet zone adjacent the rotor body slotted portion, said axial portions disposed in the inlet zone also defining first inlet ports communicating with the internal passages of the slot-lying conductors, first inlet conduit means extending beneath the end turns for conducting a first portion of coolant gas to said first inlet zone, whereby cold gas is furnished directly to the slot-lying portions, second blocking means disposed beneath and between the end turns and defining together with the first blocking means, the rotor, and the retaining ring a generally circumferentially extending coolant discharge zone adjacent the rotor body along the rotor pole portion and ajacent but axially outward from the first blocking means along the rotor slotted portion, the end windings in said discharge zone defining outlet ports communicating with the internal passages of the end windings, said pole portion defining ports for removing the gas from beneath the retaining ring, whereby coolant may be discharged from the end winding internal passages through the pole portion, said second blocking means defining on its opposite side together with the retaining ring and the rotor a second inlet zone containing the circumferential portions of the end windings, said circumferential portions defining second inlet ports connecting with the internal passages of the windings, second inlet conduit means for introducing a second portion of coolant gas to the second inlet zone for supplying said second inlet ports to the end windings, and flow dividing means separating said first and second inlet conduit means to separate the end winding coolant gas from the slot winding coolant gas.

3. A dynamoelectric machine rotor having a central body portion defining axial winding slots circumferentially spaced on its periphery on either side of a pole portion and spindles at either end of the body, a rotor winding comprising axially extending slot-lying portions disposed in said winding slots and end turns extending beyond the rotor body and radially spaced from the rotor spindle including end turn axial portions formed by extensions of the slot-lying portions and end turn circumferential portions connecting said axial portions at the corners of the end turns, said winding defining internal coolant passages for conducting a coolant gas, a retaining ring holding the end turns in place against centrifugal force, first blocking means disposed beneath and between the end turn axial portions and defining together with the rotor and retaining ring a first circumferentially extending inlet zone adjacent the rotor body slotted portion, said axial portions disposed in the inlet zone also defining first inlet ports communicating with the internal passages of the slot-lying conductors, first inlet conduit means extending axially beneath the end turns for conducting a first portion of coolant gas to said first inlet zone whereby cold gas is furnished directly to the slot-lying portions, second blocking means disposed beneath and between the end turns and defining together with the first blocking means, the rotor, and the retaining ring a generally circumferentially extending coolant discharge zone adjacent the rotor body along the rotor pole portion and adjacent but axially outward from the first blocking means along the rotor slotted portion, said second blocking means also extending axially outward between the rotor spindle and the retaining ring to define a longitudinal discharge zone connecting with the circumferentially extending discharge zone and isolating within said longitudinal discharge zone sections of the circumferential portions of the end windings between the centers and the corners thereof, the end windings in said discharge zones defining outlet ports connecting the internal passages of the end windings with the discharge zones, said pole portion also defining ports for removing the gas from beneath the retaining ring, whereby coolant may be discharged from both the circumferential portions and the axial portions of the end winding internal passages through the rotor pole portion, said second blocking means defining on its opposite side together with the retaining ring and the rotor a second inlet zone containing the corners of at least the longer end windings, the windings adjacent said corners defining second inlet ports connecting with the internal passages of the axial portions of the end windings for introducing gas to flow axially through the axial portions of the end windings and third inlet ports for introducing gas into the circumferential portions of the end windings to flow circumferentially, and second inlet conduit means introducing a second portion of coolant gas to the second inlet zone for supplying gas to the second and third inlet ports, whereby the longer end windings may be cooled by flowing cooling gas axially toward the circumferentially extending discharge zone and circumferentially toward the longitudinal gas discharge zone.

4. A dynamoelectric machine rotor having a central body portion defining axial winding slots circumferentially spaced on its periphery on either side of the pole portion and spindles at either end of the body, a rotor winding comprising axially extending slot-lying portions disposed in said winding slots and end turns extending beyond the rotor body and radially spaced from the rotor spindle including end turn axial portions formed by extensions of the slot-lying portions and end turn circumferential portions connecting said axial portions at the corners of the end turns, said windings defining internal coolant passages for conducting a coolant fluid, a retaining ring holding the end turns in place against centrifugal force, first blocking means disposed beneath and between the end turn axial portions and defining together with the rotor and the retaining ring a first circumferentially extending inlet zone adjacent the rotor body slotted portion, said axial portions disposed in the inlet zone also defining first inlet ports communicating with the internal passages of the slot-lying conductors, first inlet conduit means extending axially beneath the end turns for conducting a first portion of coolant gas to said first inlet zone, whereby cold gas may be furnished directly to the slot-lying portions, second blocking means disposed beneath and between the end turns and defining together with the first blocking means, the rotor, and the retaining ring a generally circumferentially extending coolant discharge zone adjacent the rotor body along the rotor pole portion and adjacent but axially outward of the first blocking means along the rotor slotted portion, said second blocking means also extending axially outward between the retaining ring and the rotor spindle to define an axially extending discharge zone enclosing sections of the circumferential portions of the end windings, the axial portions of the end windings in the circumferentially extending discharge zone and the circumferential portions of the end windings in the axially extending discharge zone defining first and second outlet ports respectively communicating with the internal passages of the end windings, said pole portion also defining ports for removing gas from beneath the retaining ring, whereby coolant gas may be discharged from the circumferential and axial portions of the end windings through the rotor pole portion, said second blocking means defining on its opposite side together with the retaining ring and the rotor second and third inlet zones circumferentially separated from one another by the longitudinal extension of the second blocking means, said second inlet zone containing sections of the circumferentially extending portions of the end turns between the centers and the corners thereof, said third inlet zone containing the corners of at least the longer end turns, second inlet ports defined at substantially the center of the circumferentially extending portions of the end windings in the second inlet zone and communicating with the internal passages of the windings, third and fourth inlet ports defined by the windings adjacent the corners of the longer end windings located in the third inlet zone and communicating with the internal passages of the axial portions of the end windings and the circumferential portions of the end windings respectively, second inlet conduit means introducing a second portion of coolant gas to the second inlet zone for cooling the central portions of the circumferential portions of the end windings, and third inlet conduit means for introducing a third portion of coolant gas to the third inlet zone for introducing coolant at the corners of the longer end windings to flow both axially and circumferentially therefrom to the circumferentially extending and axially extending discharge zones respectively.

References Cited in the file of this patent

UNITED STATES PATENTS

| | | |
|---|---|---|
| 2,653,255 | Baudry et al. | Sept. 22, 1953 |
| 2,755,395 | Kilner | July 17, 1956 |
| 2,786,951 | Morgan | Mar. 26, 1957 |
| 2,833,944 | Willyoung | May 6, 1958 |